Oct. 18, 1955
J. MORKOSKI ET AL
2,720,824
AGRICULTURAL IMPLEMENT
Filed Dec. 6, 1949
2 Sheets-Sheet 1
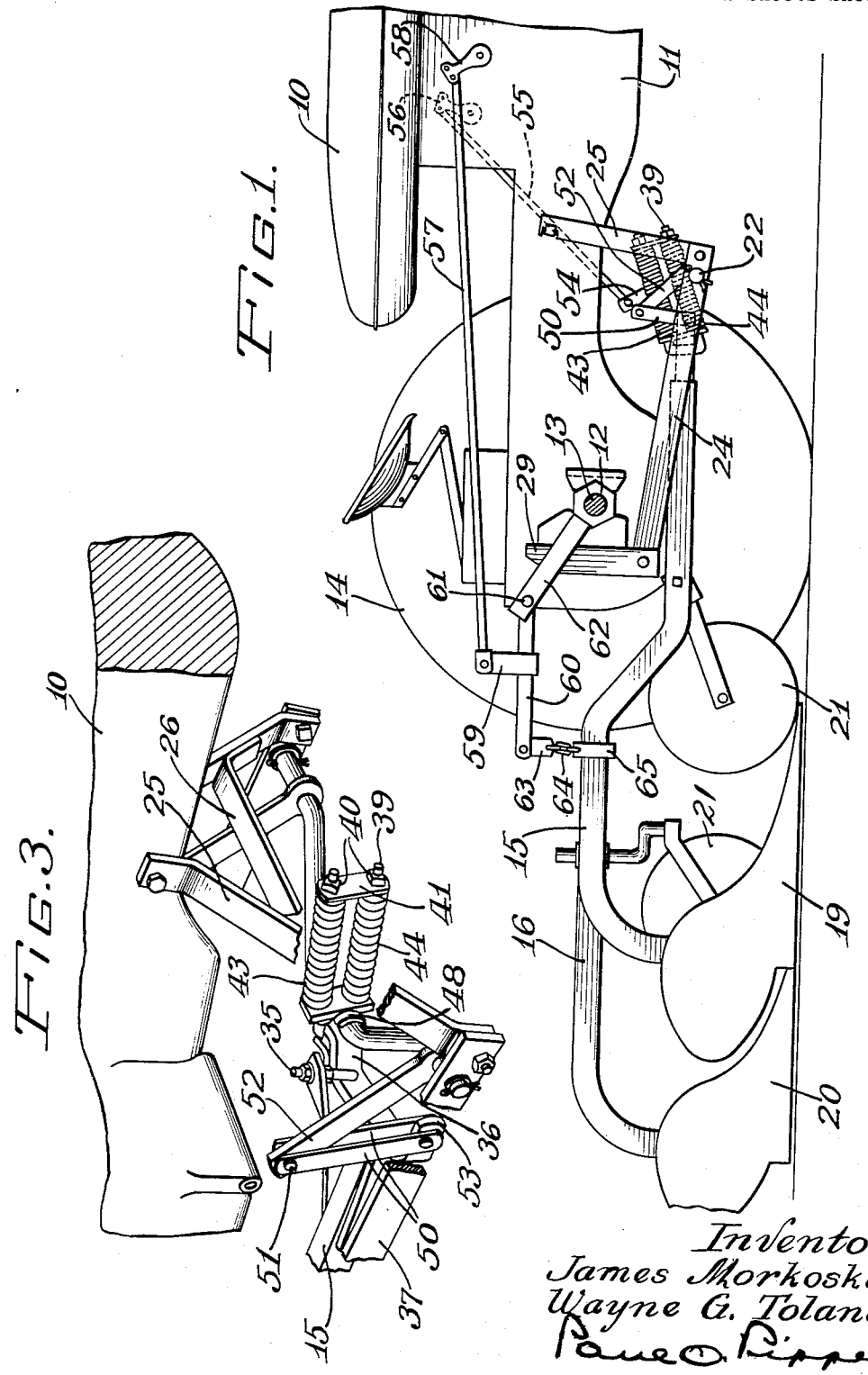
Inventor:
James Morkoski
Wayne G. Toland
Paul O. Pippel
Atty.

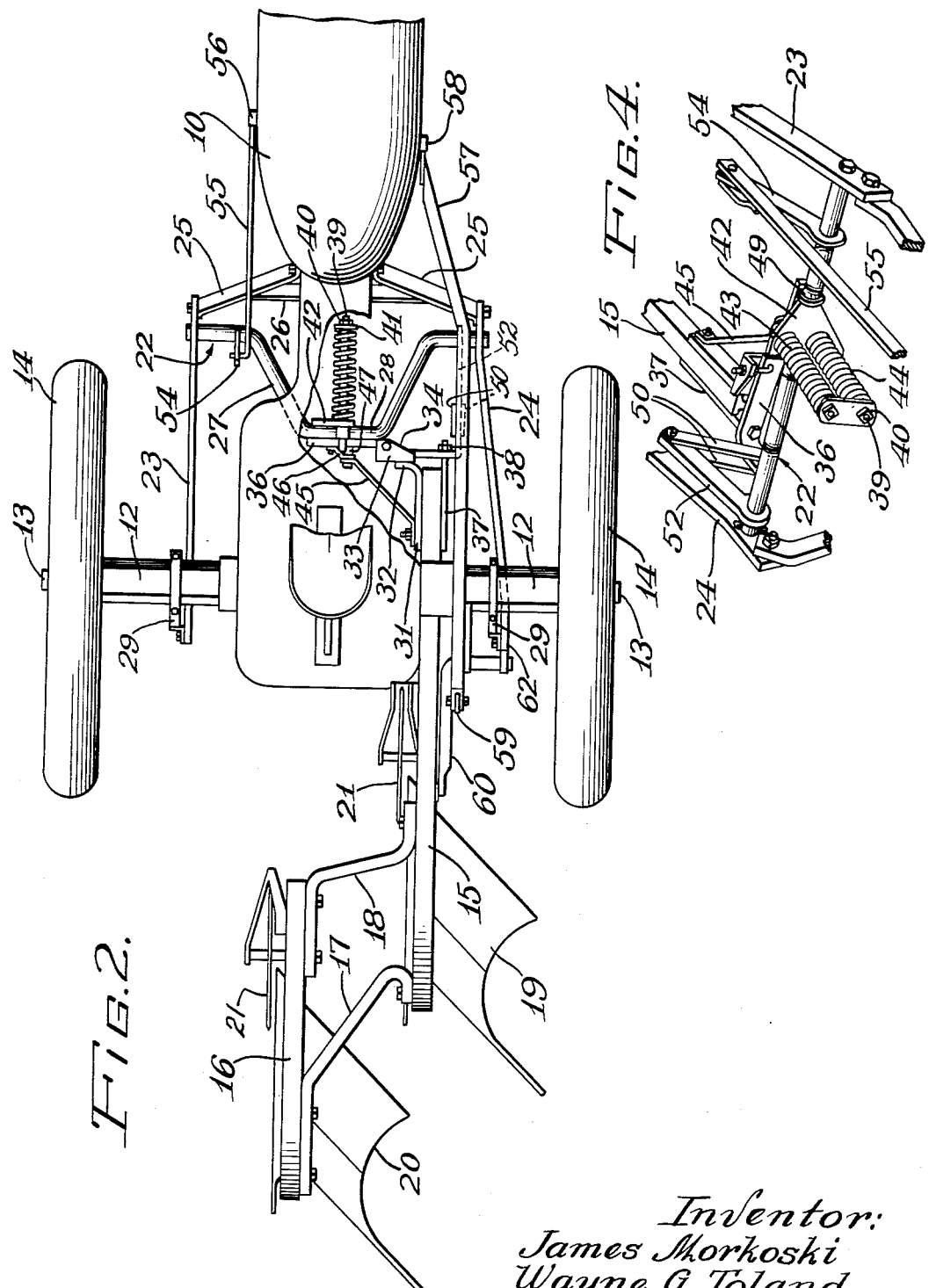

United States Patent Office 2,720,824
Patented Oct. 18, 1955

2,720,824

AGRICULTURAL IMPLEMENT

James Morkoski, Liverpool, and Wayne G. Toland, Canton, Ill., assignors to International Harvester Company, a corporation of New Jersey Application December 6, 1949, Serial No. 131,349

2 Claims. (Cl. 97—47.56)

This invention relates to agricultural implements and particularly to plows.

In attaching a plow to a propelling vehicle such as a tractor, the beam of the plow is connected to the tractor in such a way as to permit the plow bottom to operate adjacent the tractor wheel running in the previously made furrow. The plow beam is therefore connected to the tractor draw-bar at a location spaced to one side of the center line of the tractor. The side draft on the tractor caused by the pull of the plow is difficult for the tractor to overcome and subjects it to abnormal stresses as well as interfering with the steering operation.

The present invention is designed to overcome these disadvantages and has for its object the provision of an improved tractor propelled plow and hitch construction.

Another object of the invention is the provision of an improved plow and hitch construction wherein the effective point of attachment of the plow to the tractor is at the center line thereof, although the plow beam and bottom are spaced laterally therefrom.

A further object of the invention is to provide for a tractor mounted plow having a beam extending generally parallel to the direction of travel, an effective draft connection to the tractor laterally spaced from the front end of the beam.

Other objects and advantages of the invention will become clear from the following detailed description when read in conjunction with the accompanying drawings, wherein:

Figure 1 is a view in side elevation of the rear end of a tractor having a plow embodying the features of the present invention attached thereto;

Figure 2 is a plan view of the construction shown in Figure 1;

Figure 3 is an enlarged detail with parts removed for clarity showing the hitch construction by which the plow is attached to the tractor; and Figure 4 is a view in perspective of the plow hitch construction dissociated from the tractor.

Referring to the drawings, the plow with which the present invention is concerned is shown and described as mounted upon a tractor 10 having a power plant 11 and a transverse rear axle structure 12 extending laterally from opposite sides of the tractor body and journalling an axle 13 carrying drive wheels 14.

Directly connected to the tractor to be supported thereupon in transport position is an agricultural implement in the form of a moldboard plow comprising a pair of laterally spaced, longitudinally extending supports or beams 15 and 16 connected together by cross-braces 17 and 18. The implement of the present invention is a two-bottom plow and each of the beams 15 and 16 is curved downwardly at its rear end and provided respectively with plow bottoms 19 and 20. The beams 15 and 16 also have mounted thereupon rolling coulters 21.

When the tractor 10 is travelling across the field propelling the plow, the right drive wheel 14 of the tractor travels in the furrow previously made by the moldboards 19 and 20. The drive wheel rides adjacent the furrow wall and the plow bottoms penetrate the earth adjacent the tractor wheel.

Tool beam 15 carrying the plow bottom 19 is elongated and extends forwardly beneath the rear axle housing 12 of the tractor, and it will be noted particularly well in Figure 2 that beam 15 is laterally offset to one side of the center line of the tractor.

Beam 15 is connected to the tractor by draft mechanism comprising a bail 22, the ends of which are journaled in a pair of straps 23 and 24. Each of these straps is supported at its front end from the tractor by braces 25 connected by a cross-piece 26. Bail 22 is provided with a rearwardly bent mid-portion 27 having a transverse bight portion 28. The rear ends of the straps 23 and 24 are connected to brackets 29 secured to the rear axle housing 12 of the tractor. Bail 22, by virtue of its pivotal mounting in the straps 23 and 24, is capable of rocking movement so that the bent portion 27 may be swung generally vertically for a purpose which will hereinafter become clear. Bail 22 serves as the draw-bar by which draft is transmitted from the tractor to the plow attached thereto. Attachment of the plow to the bail 22 is made by a hitch construction including a bar 31 having a laterally bent portion 32 to which is secured, as by welding, an angle plate 33 having a flange portion 34 apertured to receive the threaded end of a hook bolt 35, the lower end of which is anchored to a transversely extending bar 36. On the side of beam 15 opposite the bar 31 is another bar 37, the forward end of which projects from the front end of the beam and diminishes in size to form a threaded bolt projecting through an aperture in the bar 36 and having a nut 38 on the end thereof.

The inner end of the bar 36 parallels the bight portion 28 of the bail 22 and is closely adjacent thereto. An elongated U-shaped bolt 39 is provided which confines the bar 36 and the bight portion 28 of the bail and the ends of which extend forwardly and are threaded at their ends to receive nuts 40. The ends of the U-bolt are connected by a plate 41 which serves as a spacer and another plate 42 is provided adjacent the bight portion 28 of the bail. Between the plates 41 and 42 and surrounding the arms of the U-bolt are springs 43 and 44. A brace 45 is bolted at one end to the forward portion of the beam 15 and extends diagonally and has its other end bolted to an angle member 46 also bolted to the bar 36 and extending outwardly therefrom to cover the closed end of the U-bolt. A spacer 47 is likewise provided between the angle member 46 and the bar 36. The bolts which connect the brace 45 to beam 15 and member 46 are sufficiently loose to accommodate some movement of the beam about the axis of the forward end of bar 37 in the aperture in bar 36. This movement is accomplished by adjusting bolt 35 relative to plate 33 and is for the purpose of leveling the plow.

As will be observed particularly well in Figures 3 and 4, a pair of arcuate projections 48 and 49 are welded to the bight portion 28 of the bail 22 and confine the triangularly shaped plate 42 against lateral displacement. At this point it may be observed that the U-bolt 39 and the springs 43 and 44 provide a resilient draft connection for the plow to the tractor so that the plow upon striking an obstruction or hard ground will move rearwardly against the cushioning action of the springs. It should likewise be observed that the draft connection of the plow to the tractor is not on a line with the plow beam 15 as is customarily the case in attaching a plow to a tractor, but instead is laterally inwardly offset from the plow beam 15 to provide a draft connection with the tractor closely adjacent the center line thereof. It has already been pointed out that to attach the plow to the tractor at a point on a line with the beam 15 would result in abnormal forces being applied to the tractor by the pull of the plow, and this is avoided by providing a line of draft from the center of the tractor.

In operation, the tool beams 15 and 16 travel behind the tractor parallel to the direction of travel thereof, and it is important that in turning the tractor the plow be permitted to swing to some extent to right and left in order to follow the path of the tractor as it is steered over the field to be plowed and in turning. This is accommodated by the flexible draft connection provided by the U-bolt 39 and the springs 40, the bar 36 moving away from the bight portion 28 of the bail 22 at either end depending upon the direction in which the plow swings. The springs 43 and 44 tend to return the plow to its normal operating position as viewed in Figure 2.

An articulated stabilizing connection for the plow is provided by a pair of pivoted links 50 which extend generally vertically and are pivotally connected at their upper ends at 51 to an arm 52 affixed to the bail 22 at a location adjacent the strap 24. Arm 52 extends upwardly and rearwardly from the bail, and the lower ends of the links 50 are pivotally connected to a forwardly bent portion 53 of the bar 36. These pivoted links 50 swing forwardly and rearwardly with longitudinal movement of the plow relative to the tractor and accommodate limited lateral swinging thereof with a minimum of twisting of the plow beams about a longitudinal axis, thus maintaining the plow substantially stable under all operating conditions. These links 50 also accommodate the rearward movement of the plow relative to the tractor when obstructions are encountered while transmitting no draft force from the tractor to the plow in normal operation thereof.

It has already been noted that bail 22 may be swung generally vertically about the pivotal connections of the bail to the straps 23 and 24. Such a vertical movement of the bight portion 28 of the bail, of course, moves the front end of the plow vertically to change the pitch of the plow bottoms 19 and 20 and thus alter the operating depth thereof. For adjusting the depth of operation of the plow to selected positions another arm 54 is secured to the bail 22 adjacent the strap 23 at the end of the bail opposite the arm 52. Rocking of an arm 54, of course, rocks the bail and this is accomplished by a rod 55 pivotally connected at one end to the arm 54 and at its other end to a rock arm 56 mounted upon the side of the tractor. Rock arm 56 is rocked by any suitable mechanism deriving power from the tractor power plant, and preferably by hydraulic cylinders, not shown, of the double-acting type supplied with fluid under pressure from a tractor source, not shown, and under the control of the tractor operator.

The plow is lifted by the connection of a rod 57 at one end to a rock arm 58 mounted on the side of the tractor opposite the arm 56 and similarly powered by conventional mechanism, not shown. The other end of rod 57 is pivotally connected to a bracket 59 secured to a lift arm 60 pivoted at 61 upon a brace 62 affixed to the bracket 29 mounted on the rear axle housing 12 of the tractor. The rear end of arm 60 is provided with a depending lug 63 connected by a chain 64 with a lug 65 mounted on the beam 15. In Figure 1 the plow is shown in lowered position. Upon forward rocking of the rock arm 58, rod 57, acting through lift arm 60 and chain connecting link 64, lifts the plow to a transport position upon the tractor about its pivotal connection to the bail 22. The pivot of the bight portion 28 of the bail between the bar 36 and the plate 42 likewise accommodates the vertical swinging movement of the bail to adjust the depth of operation of the plow.

It is believed that the operation of the plow of the present invention will be clearly understood from the foregoing description. It should likewise be understood that modifications may be made in the construction and arrangement of parts without departing from the spirit of the invention or the scope of the appended claims.

What is claimed is:

1. In a tractor propelled plow or the like wherein an earth working tool is carried by a support extending longitudinally generally parallel to the path of travel of the tractor and to one side of the center line thereof, a laterally inward extension on the forward end of the support, hitch means including a spring providing a draft connection between the said extension and the tractor adjacent the center line thereof to provide a line of draft on the plow remote from and generally parallel to said support, said draft connection accommodating limited longitudinal movement and lateral swinging of the plow against the action of the spring, and a generally vertically extending pivoted link connected between the tractor and the forward end of the support inoperative to transmit draft therebetween in normal operation and arranged to maintain the plow substantially level while accommodating longitudinal and lateral swinging movement thereof about its draft connection.

2. In a tractor propelled plow or the like wherein an earth working tool is carried by a beam extending longitudinally generally parallel to the path of travel of the tractor and to one side of the center line thereof, a generally horizontally extending bail serving as a draw-bar pivoted on the tractor and having a rearwardly extending bight portion centrally positioned relative to the tractor and arranged for generally vertical swinging movement about the pivots of the bail on the tractor, a lateral extension on the forward end of the beam and extending inwardly therefrom, a draft connection between the extension and the bight portion of said bail at a location laterally removed from the beam, means for selectively vertically swinging said bail to raise and lower the front end of the plow for depth adjustment thereof, and a stabilizing connection between the beam and the tractor comprising an arm affixed to the bail and a generally vertically extending pivoted link connecting said arm to the front end of the beam.

References Cited in the file of this patent

UNITED STATES PATENTS

| | | |
|---|---|---|
| 925,197 | Kloke | June 15, 1909 |
| 951,638 | Flagg | Mar. 8, 1910 |
| 1,262,950 | Heylman | Apr. 16, 1918 |
| 1,378,842 | Dittbrenner | May 24, 1921 |
| 1,512,535 | Hansmann et al. | Oct. 21, 1924 |
| 1,663,249 | Graham et al. | Mar. 20, 1928 |
| 1,722,786 | Brown | June 30, 1929 |
| 1,941,013 | Lindgren et al. | Dec. 26, 1933 |
| 2,012,458 | Strandlund | Aug. 27, 1935 |
| 2,383,698 | Young | Aug. 28, 1945 |
| 2,403,360 | Graham | July 2, 1946 |
| 2,586,919 | Court | Feb. 26, 1952 |